May 8, 1934.  W. W. HARTMAN  1,957,957
TRAY MAKING MACHINE
Filed Feb. 16, 1931   6 Sheets-Sheet 1

Inventor
William Walter Hartman.
Attorney

May 8, 1934.  W. W. HARTMAN  1,957,957
TRAY MAKING MACHINE
Filed Feb. 16, 1931   6 Sheets-Sheet 5

Patented May 8, 1934

1,957,957

UNITED STATES PATENT OFFICE 1,957,957

TRAY MAKING MACHINE

William Walter Hartman, Los Angeles, Calif.

Application February 16, 1931, Serial No. 515,957

32 Claims. (Cl. 93—44)

This invention has to do with machines for making trays or containers, and is particularly adaptable to the making of such articles from light-weight paper and of the nature set forth in my copending application No. 468,057 filed July 15, 1930.

The use of ready-sliced bread has recently become very popular and has created a large demand for a suitable paper tray in which to place the sliced loaf so it may be handled as a unit. Such a tray is usually applied to the loaf immediately after slicing and thus serves to hold the slices together during the time the loaf passes through the wrapping machine. Inasmuch as the baker receives no additional return for this extra service, it is desirable to keep the cost of the trays used, along with the other items, down to a minimum. This requires that the trays be made of a light, inexpensive material and that they be made rapidly and cheaply.

It is an object of my invention to provide a machine capable of making trays at a minimum cost. My device attains this end since it is capable of making trays at a high rate of speed from a light weight and therefore relatively inexpensive paper. The character of the machine is such that it may be made small enough to be used in a bakery directly in connection with a bread slicer.

A further advantage of my machine is that it is adapted to form the trays of oiled or waxed paper which is a much more sanitary material than cardboard, but is more difficult to handle in a forming machine.

Another object of my invention is to provide a machine adapted to make trays from a single, rectangular sheet of paper that has not been cut or notched at the corners before folding as an aid to forming the tray corners. This eliminates all cutting except to cut from the paper strip fed into the machine, a sheet of the correct size. A stronger tray results.

Also, I provide a machine that is adapted to manufacture such paper trays without the use of metallic staples, which are apt to enter the bread, and without the troublesome use of adhesive means. My device fastens the tray corners together by cutting tongues from the tray walls and tucking these tongues through slits in such a manner as to interlock the tray walls. As explained in the above referred to copending application, this means of fastening the ends of the paper trays is quite simple yet still gives adequate strength to the tray.

How I accomplish these objects, and other advantages of my invention may be understood better by reference to the following description and the accompanying drawings, in which.

Figures 1, 7, 7A:
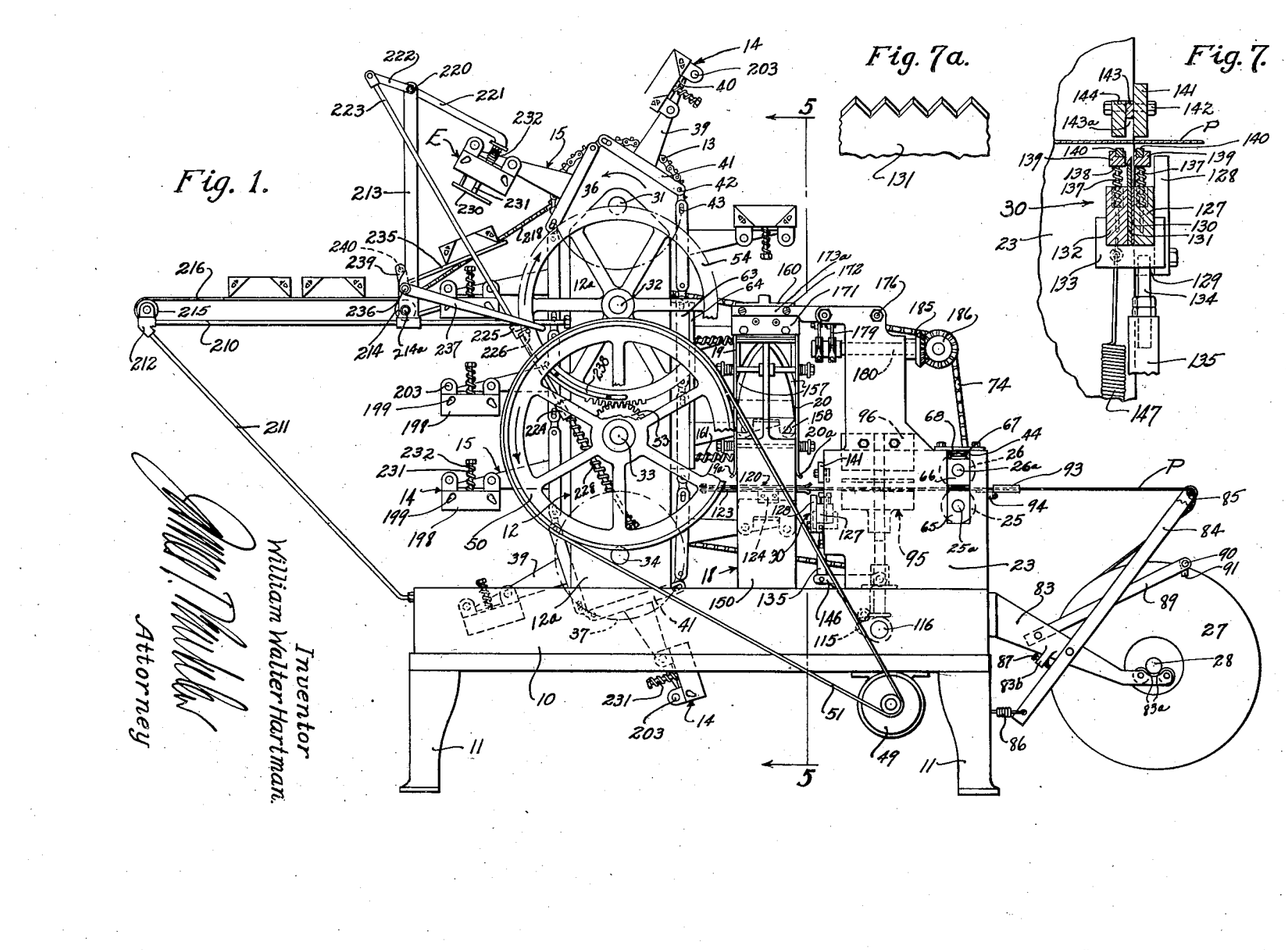
Fig. 1 is a side elevation of my tray making machine.
Fig. 7 is a detached fragmentary view of the cutter bar assembly in transverse cross section, being an enlargement of such assembly as it appears in Fig. 6.
Fig. 7a is a detached fragmentary profile of the cutter blade teeth.
Figures 2, 8:
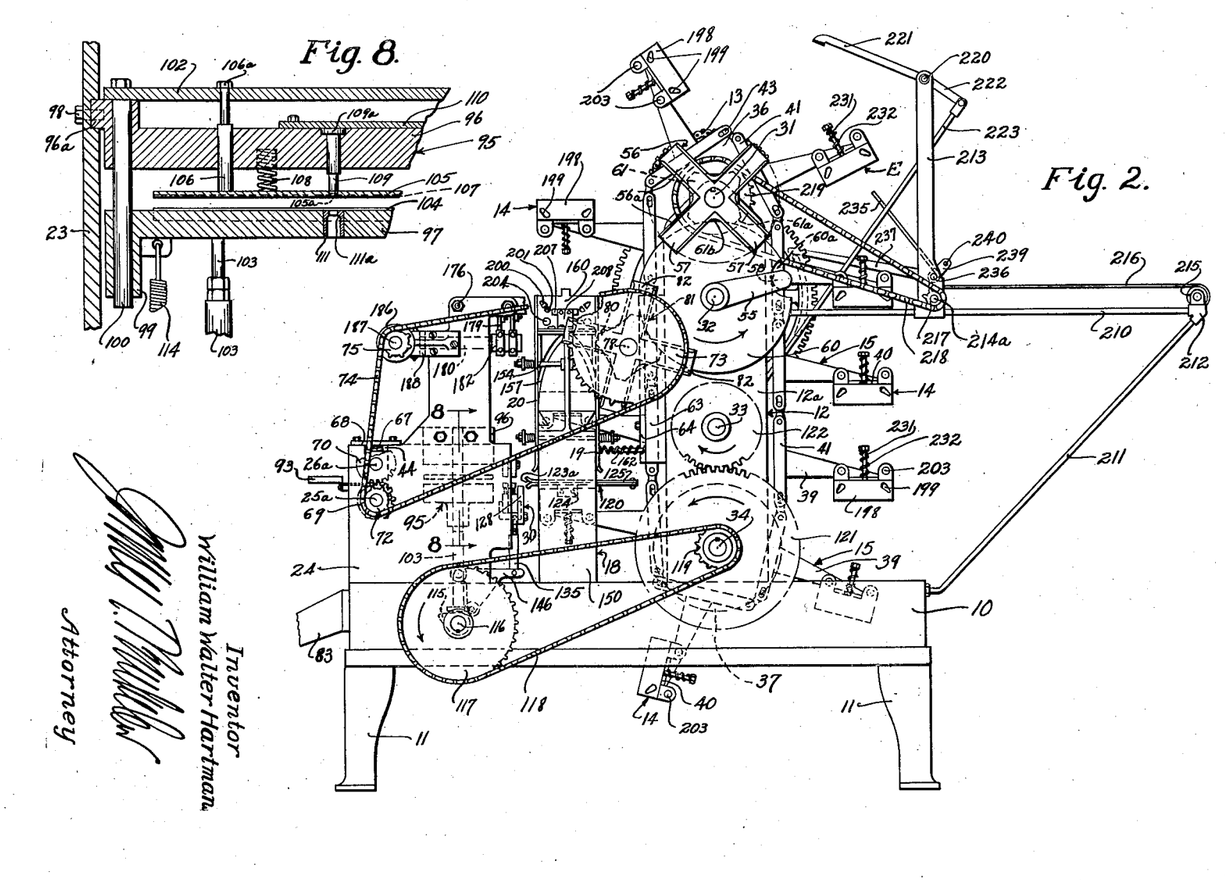
Fig. 2 is an opposite side elevation of the machine.
Fig. 8 is an enlarged fragmentary section on line 8—8 of Fig. 2, showing the creasing die assembly in longitudinal section, the optional use of additional punches also being illustrated.

Referring more particularly to Figs. 1 and 2 which show the machine in side elevation, it will be seen that the mechanism is carried generally upon a horizontally extending base member 10 which is supported by legs 11. Supported on base 10 and rising vertically therefrom, is a body member generally designated at 12 which carries the preferred means for moving the paper past or through other relatively stationary means for forming the tray. Body member 12 consists of a box-like structure made up of vertically extending and horizontally spaced end plate portions 12a and connecting side plate portions 12b, which latter extend transversely of base 10. Such preferred form of paper moving means comprises generally a driven endless chain 13 having a series of carrying and forming blocks generally indicated at 14, each block being attached to the chain by means of a bracket 15. Though it lies within the scope of my invention to provide other than a vertically moving paper carrying means, I shall show and describe a vertically moving carrying means that forms the trays on its upwardly moving side. In any case the working or paper carrying face of a block 14 will be its forward or advancing face.

Figures 11, 12, 13, 14:
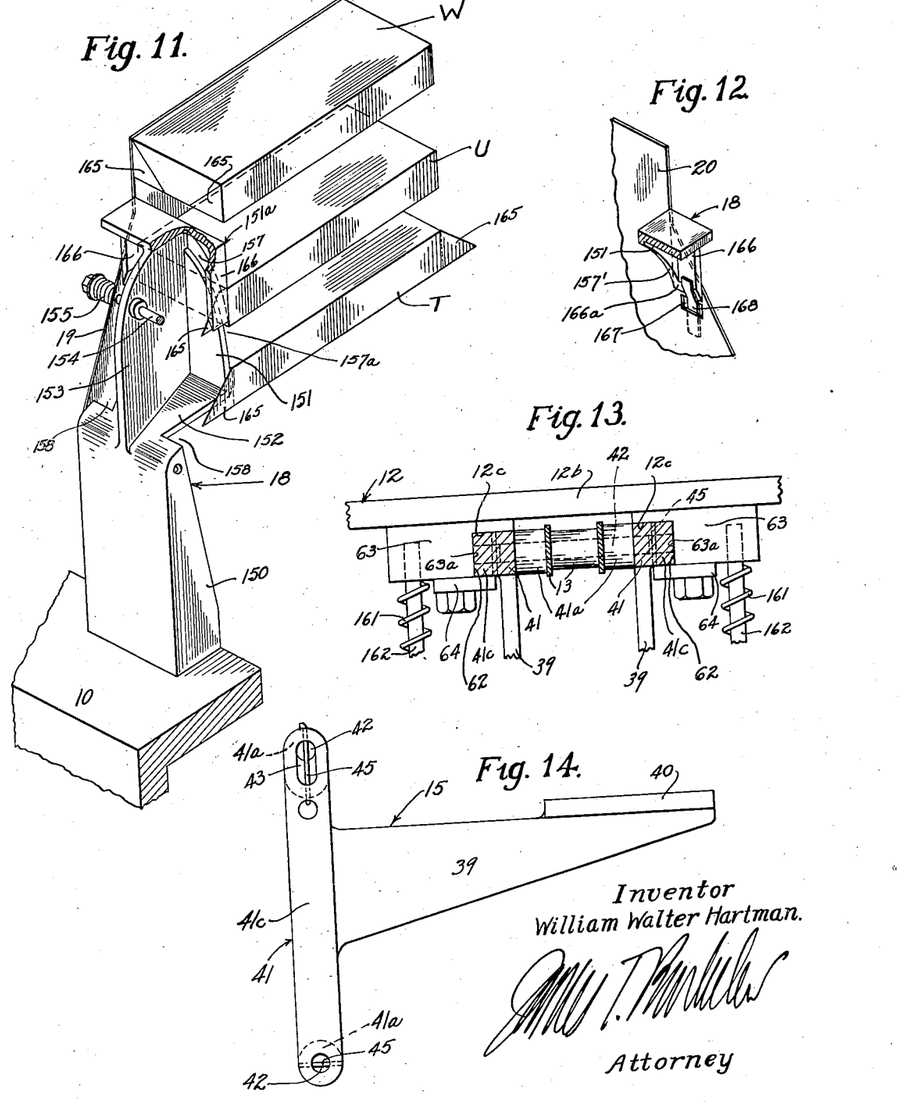
Fig. 11 is a perspective view of an end-former showing diagrammatically therewith a tray in three successive steps or stages of folding.
Fig. 12 is a detached fragmentary perspective showing spring means for guiding the folds of paper into the slotted plate of the end-former.
Fig. 13 is a detached fragmentary horizontal cross-section on line 13—13 of Fig. 5.
Fig. 14 is a detached side elevation of a forming block bracket.

The preferred means for folding or forming the trays includes the end-formers indicated generally at 18, (Figs. 1, 5 and 11) and side forming plates 19 and 20 (Figs. 2, 11 and 12). Suitable means for fastening the ends of the trays after folding will be later detailed. Mounted at one end of base 10 and rising vertically therefrom, one on each side, are a pair of horizontally spaced frame plates 23 and 24 (Figs. 1, 2 and 4), which plates carry the balance of the operating mechanism, including a pair of rolls 25, 26 which are adapted to withdraw paper strip P from supply roll 27 and feed it through the cutter assembly generally indicated at 30 (Figs. 1, 6 and 7) to the means for forming these paper trays, all of which will be set forth later in greater detail.

Figure 5:
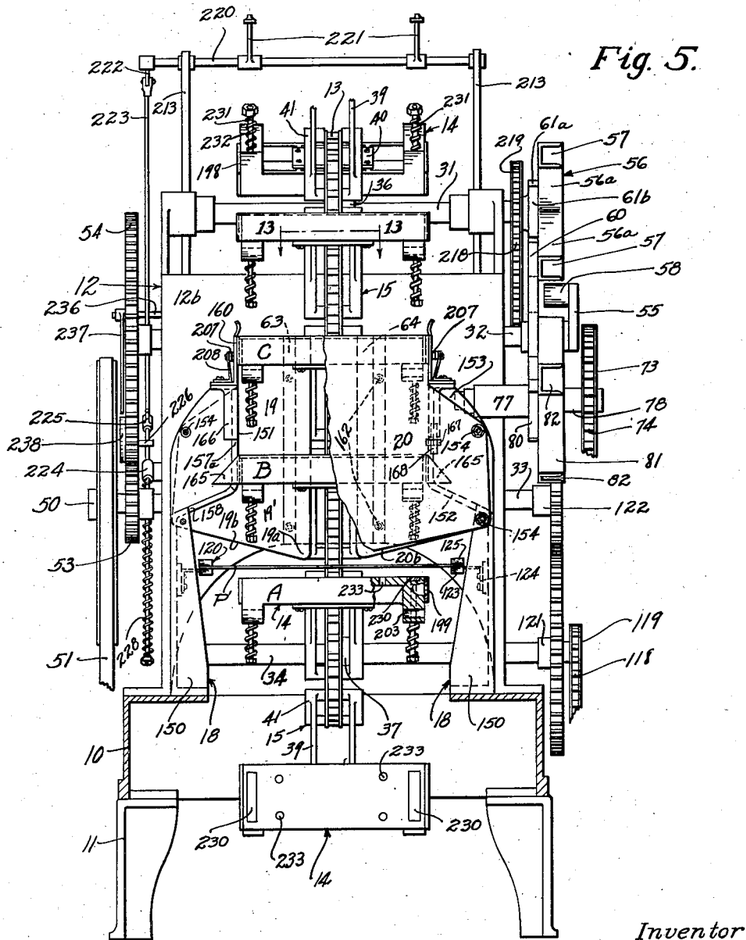
Fig. 5 is a sectional view taken along the line 5—5 of Fig. 1.
Figures 6, 6A:
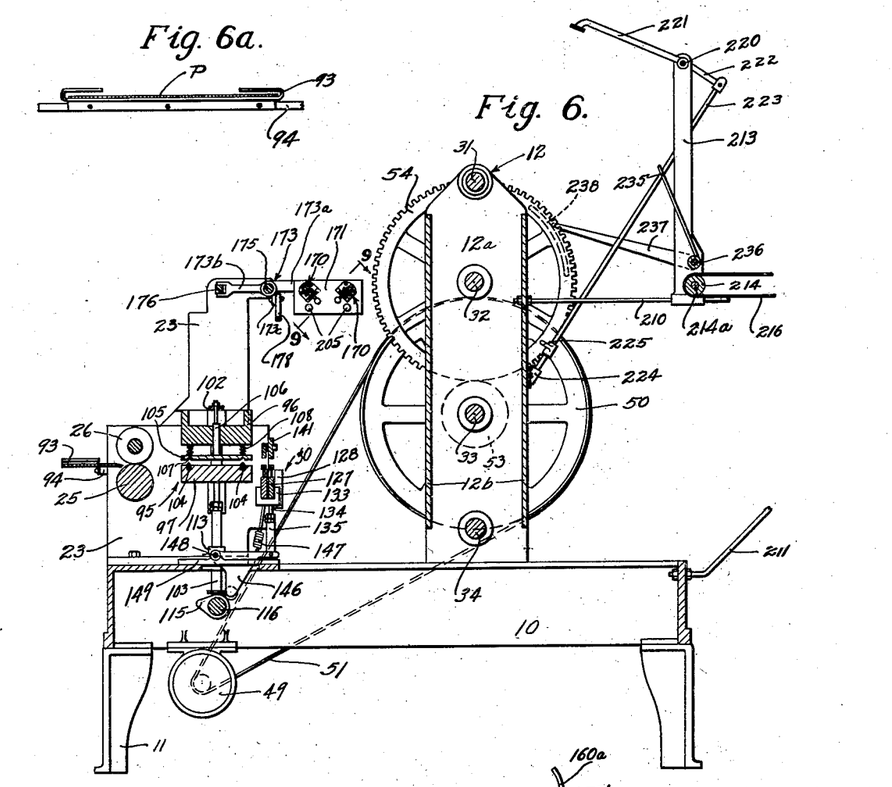
Fig. 6 is a longitudinal sectional view taken along the line 6—6 of Fig. 3.
Fig. 6a is a detached end view of the paper guide.

Extending transversely of base 10 and journaled in end plates 12a of body 12 are four shafts 31, 32, 33 and 34 (Fig. 6). Keyed to top shaft 31 midway of its length is a sprocket wheel 36 (Figs. 1 and 3) while directly beneath it and in alinement therewith is a similar sprocket wheel 37 (Figs. 1 and 5) keyed to bottom shaft 34. Around these two sprocket wheels and carried thereby runs the endless chain 13 which serves as the supporting and driving means for the block carrying brackets 15. Each bracket 15 consists of a pair of horizontally spaced tapered arms 39 (Figs. 1, 3, 13 and 14) that are joined at their outer ends by cross-bar 40 upon which a forming block 14 is mounted, while integral with the inner end of each arm 39 is a thicker transverse bar 41. The opposite ends of bars 41 are pinned to chain 13, one bar on either side of the chain, as illustrated in Figs. 13 and 14. Bars 41 are made of a length to span a number of links in chain 13 and where they are to be attached to the chain the normal chain-pins are taken out and longer pins 42 substituted therefor, pins 42 being long enough to extend through chain 13 and into bosses 41a on the opposite ends of bars 41. It will be seen from Fig. 1 that when any given portion of chain 13 passes over either sprocket, the associated bars 41 form a chord while said chain portion follows the circumference of the sprocket. Hence, the distance between pins 42 as measured along the sprocket circumference will be greater than the distance as measured along bar 41. It is therefore essential to provide a lost-motion connection between the chain and bars 41. For this purpose I have provided a longitudinally extending slot 43 in one end of each bar 41 to allow the associated pin 42 to play therethrough and thus compensate for this difference in distances. Pins 45 extend through bar 41 to prevent endwise displacement of pins 42. It will be seen that due to the pivotal connection of the individual bars 41 to common chain 13, the series of brackets 15 and associated blocks 14 may be considered as an articulated carrier and forming member.

Power to drive the mechanism is derived from motor 49 which drives the pulley 50 through belt 51. Pulley 50 is keyed to shaft 33 to which is also keyed a pinion 53, (Fig. 1) said pinion meshing with gear 54 which is keyed to shaft 32. Secured to the other end of shaft 32 is the arm or crank 55 which constitutes the driving element of the preferred means for moving blocks 14, as will now appear.

It is necessary that forming blocks 14 be advanced intermittently, since they must remain stationary during the performance of certain operations. To accomplish this, the sprocket 36 which drives chain 13 is rotated intermittently. While it lies within the scope of my invention to provide any suitable type of intermittent drive, I have illustrated as a preferred drive a novel, modified form of geneva movement.

As illustrated in Fig. 2, star wheel 56 is fastened to one end of shaft 31, said wheel having four radial arms 56a which are spaced 90° apart, there being a channel 57 extending longitudinally of each arm. These channels are adapted to be successively drivingly engaged by roller 58 (Fig. 5) mounted on and extending transversely from the free end of crank 55. The relation of star wheel 56 and crank 55 is such that the continuous uniform motion of crank 55 in a counter-clockwise direction (as viewed in Fig. 2) is communicated to wheel 56 as intermittent, clockwise motion. As crank 55 is rotated, roller 58 enters the outer end of the lower right hand channel 57 in Fig. 2; the crank then rotates wheel 56 through 90°, at the completion of which motion said channel occupies the position of the lower left hand channel of that figure. Continued rotation of crank 55 clears the roller from said channel. Wheel 56 thus comes to rest until crank 55 has rotated sufficiently to enter roller 58 in the channel of the succeeding arm which has been brought to a position of register with said roller by the preceding advance of wheel 56.

It will be noted that when roller 58 enters and leaves a given channel 57 the direction of motion of roller 58 is substantially radial of star wheel 56, while, between these points it uniformly approaches and recedes from a direction tangential of the star wheel. Hence, though the angular velocity of crank 55 is constant, the angular velocity of star wheel 56 passes from zero through a maximum and back to zero as the wheel is uniformly accelerated and decelerated, which is of obvious advantage since the load on the star wheel shaft 31 is intermittently picked up and released. Accordingly, chain 13, which is driven by sprocket 36 on the star wheel shaft, and blocks 14 which are carried by said chain, are advanced intermittently, smoothly, and without jar or appreciable over-run.

During periods of rest between motions of the forming blocks, it is necessary that these be held firmly in a definite position so that they will always register with certain other mechanisms to be later described. This is accomplished by means of disk 60 and stop member 61 (Figs. 2 and 5) keyed to shafts 32 and 31, respectively, just to the left of crank 55 and wheel 56, respectively, as viewed in Fig. 5. The periphery of disk 60 is notched at 60a, the notch being in horizontal alinement with roller 58. Member 61 is approximately square, though the corners 61a are beveled off and the perimeter portions 61b between the corner bevels are concave and have the same radius of curvature as the periphery of disk 60. Corners 61a lie, one each, in horizontal alinement with the star wheel arms 56a. Disk 60 and member 61 are so centered that the periphery of disk 60 normally engages one of the concaves 61b of member 61, thus preventing rotation of member 61 and shaft 31 to hold against movement all parts adapted to be driven by said shaft. However, as crank 55 brings roller 58 into a given channel 57, notch 60a comes into register with corner 61a associated with said channel, thus freeing said member 61 for rotation and unlocking shaft 31 so it may be rotated by movement of roller 58 through the star wheel channel. As roller 58 moves out of the given channel, corner 61a leaves notch 60a and the succeeding concave 61b is engaged by the unnotched periphery of disk 60 whereby shaft 31 is again locked. The diameter of sprocket 36 is such that the 90° movement imparted to it by a single actuation of star wheel 56 moves a given forming block 14 into the position occupied by the block next above it (referring to the blocks at the left of shafts 31, 34 in Fig. 2) during the immediately preceding period of rest. Thus, during periods of star wheel rest, the blocks are always locked in the relative positions in Figs. 1 and 2.

It has been stated that star wheel 56 is rotated clockwise, as viewed in Fig. 2, by crank 55. It follows that blocks 14 are carried in a clockwise direction, as viewed in that figure, by chain 13. Accordingly, when I subsequently refer to upward movement of the blocks, I mean upward movement of the blocks at the left of shafts 31 and 34 in Fig. 2, and upward movement of the blocks at the right of said shafts in Fig. 1.

As will become apparent later in the description, it is necessary that as the forming blocks 14 are moved upward through end-formers 18 that they be confined to a definite vertical path. In other words, brackets 15 must be so held that, in spite of any sag or slackness in chain 13, arms 39 are horizontal and blocks 14 are constrained against horizontal movement. This is accomplished by the means of opposed, vertical guide rails 63 formed integrally with the body plate 12b, as illustrated in Figs. 2 and 13. Bolted to rails 63 are vertical keeper plates 64, which with the opposed faces 63a of rails 63 and faces 12c of plate 12b define vertical guide ways 62 which take with sliding fit the portions 41c of bars 41, which portions extend horizontally beyond the outer faces of arms 39.

Figure 3:
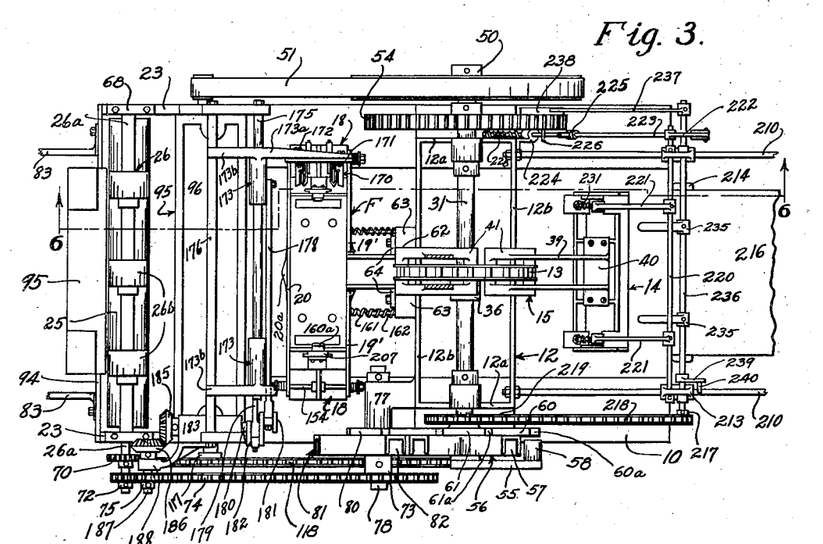
Fig. 3 is a plan view of the tray making machine
Figure 4:
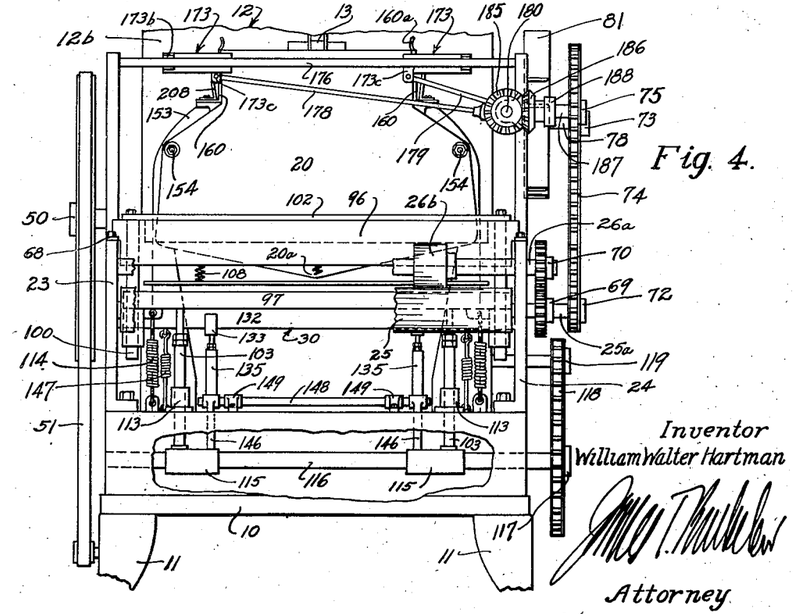
Fig. 4 is an end view, as viewed from the right of Fig. 1, certain parts being broken away for better illustration

The construction and function of the other parts of the machine may be best understood by following the advance of paper P through the machine. As the paper first enters the machine it passes through the feed rolls 25 and 26 which are mounted upon shafts 25a and 26a, respectively. Upper roll 26 is preferably made up of individual rubber collars 26b spaced horizontally along shaft 26a (Figs. 3 and 4). Shafts 25a and 26a are journaled in blocks 65 and 66 respectively which are slidably mounted in vertical slots 44 in the frame plates 23 and 24. Blocks 65 rest on the bottoms of slots 44 and serve to position roll 25. Upper blocks 66 are downwardly pressed by springs 67 which are retained in slots 44 by plates 68 bolted to frame plates 23 and 24. Springs 67 thus serve to press roll 26 toward roll 25, so said rolls grip the paper properly to feed it. As shown in Figs. 2 and 4, the shafts 25a and 26a each extend at one end beyond frame plate 24 and carry meshing spur gears 69 and 70, respectively, whereby the feed rolls are adapted to be driven one from the other in opposite directions for feeding paper therebetween.

Shaft 25a carries a sprocket 72 which is intermittently driven by sprocket 73 through chain 74 which also passes over sprocket wheel 75, the functions of which will be considered later. Sprocket 73 is mounted and driven as follows. Mounted on the left hand side of body 12 as viewed in Fig. 3, is a bearing bracket 77 in which is journaled a short shaft 78 to which are keyed a locking member 80, star wheel 81, and sprocket wheel 73. Star wheel 81 has channels 82 which are adapted to be engaged successively by roller 58, the wheel being intermittently rotated through 90° in a clockwise direction as viewed in Fig. 2, by this engagement. The construction and operation of star wheel 81 are identical with those of star wheel 56; likewise locking member 80 is similar in construction and operation to member 61, serving to hold shaft 78 and sprocket 73 against rotation except when roller 58 is traveling through one of the channels 82 to drive wheel 81. As crank 55 rotates in a counterclockwise direction as viewed in Fig. 2, it will engage star wheel 81 after it has left star wheel 56 and thus serves to rotate wheel 81 and sprocket 73 through a quarter of a revolution after the forming blocks have come to rest. This motion of sprocket 73 is transmitted through chain 74, sprocket 72 and gears 69 and 70 to feed rolls 25, 26, whereby said rolls are adapted to feed a measured amount of paper into the machine while the forming blocks are at rest. For instance, the ratio of sprocket 72 and 73 is here shown to be 1 to 4 so the feed rolls make one complete rotation for each quarter revolution of sprocket 73, and the circumferences of the feed rolls are such that one revolution thereof passes the desired, predetermined linear extent of paper.

Paper is supplied to the feed rolls from supply roll 27 which has shaft 28 supported on bearings 83a provided at the ends of frame-supported brackets 83. The sheet of paper P, after leaving roll 27 and before entering the feed rolls, passes around and over rod 85 carried at the upper ends of levers 84 pivotally mounted on brackets 83. Attached to the lower ends of levers 84 and to legs 11, are tension springs 86 which are adapted to rotate levers 84 clockwise as viewed in Fig. 1. This motion is adjustably limited by set screws 87 in lugs 83b on brackets 83, said set screws contacting the lower portions of levers 84. This device forms a shock absorbing means for taking up the jerk as the paper is intermittently drawn from roll 27 by the rolls 25 and 26. It will be appreciated that when a full roll of paper 27 is being used, it has a large amount of inertia and, consequently, when the feed rolls tend suddenly to advance the paper there is such a considerable pull-back upon the sheet that slippage is apt to occur and result in an insufficient feed of paper. With the method used, this sudden jerk is taken up by moving rod 85 towards the feed rolls in opposition to springs 86. This allows the paper to move forward easily without being opposed by the inertia of the entire roll of stock. Springs 86 then return rod 85 to the position of Fig. 1 and, in so doing, relatively slowly and evenly unwind a new supply of paper. Roll 27 is thus caused to rotate more or less continuously rather than intermittently with obvious advantage.

Also pivotally mounted on brackets 83 is a pair of arms 89 which carry, at their upper ends, cross rod 90. Slidably mounted upon the rod 90 is a pair of depending guides 91 which are spaced thereon to center stock roll 27 between them so that the paper feeds in correct alinement with reference to the rest of the mechanism. Guides 91 are spaced one on either side of roll 27 and although only one is shown (Fig. 1) the other is identical and on the opposite side of roll 27. The paper is further centered, or laterally positioned, by means of guide 93 fastened to bar 94 which extends across between the frame plates 23 and 24. Guide 93 consists of a plate having its ends bent through 180° at each end to overlap the paper (Fig. 6a) to prevent it from being displaced horizontally or vertically with respect to the feed rolls.

After passing the feed rolls and as an aid in overcoming the tendency of the paper to slip sideways off the forming blocks as it moves through the side forming plates, the advancing end of the paper strip which will later be cut off to form the rectangular sheet required to form one tray, is precreased lengthwise along the lines where the sides and bottom of the tray join. This is accomplished by the creasing device generally indicated at 95. As illustrated in Figs. 4 and 8, the creaser generally comprises an upper, stationary bridge 96 and a lower, vertically movable punch block 97. The bridge member is carried in suitable slots in frame plates 23 and 24 by means of lugs 96a, one on each end of the bridge. This prevents vertical motion of the bridge but permits it to be removed from the machine by sliding it horizontally through the slots. Bridge 96 is locked against horizontal displacement, after once being correctly positioned, by means of screws 98 passing through plates 23 and 24. Rigidly mounted at each end of bridge 96 is a vertical guide pin 100 while at each end of movable block 97 is a boss or guide portion 99 adapted to receive pin 100 so the block is accurately positioned with regard to bridge 96 as said block reciprocates vertically.

Upward motion is imparted to block 97 by means of push rods or tappets 103 which reciprocate vertically within sleeves 113 on base 10 (Fig. 6) and the return or downward stroke of the die block is aided by means of tension springs 114 extending from block 97 to base 10. Push rods 103 are intermittently raised by means of cams 115 attached to the continuously rotating shaft 116 which is journaled in the vertical side walls of base 10. On one end of shaft 116 is sprocket wheel 117 (Fig. 2) which is driven by means of chain 118 passing over sprocket 119 rotatably mounted upon shaft 34. Fastened to sprocket 119 and also rotatably mounted upon shaft 34, is gear wheel 121 meshing with gear wheel 122 keyed to shaft 33, which is the shaft carrying pulley 50. Pulley 50, as will be remembered, is driven continuously by motor 49 so that a continuous drive will be transmitted to shaft 116, the cams 115 thereon intermittently lifting push rods 103 to raise bridge 97.

It is on the upward movement of the bridge that the paper is creased. Carried lengthwise in block 97 and spaced the exact width of the tray it is desired to form, are two scoring or creasing punches 104 (Figs. 6 and 8). These punches are bars extending across the full width of paper P, and have inverted V-shaped top surfaces projecting just slightly above the surface of block 97, as is best shown in Fig. 6. Die plate 105 has complementary V-shaped die grooves 107 carried above the creasing punches, said die plate being fastened on guide pins 106 which are slidably mounted in the body of bridge 97. The top portions of guide pins 106 project through plate 102 which is bolted to the raised ends of bridge 96; and adjusting nuts 106a prevent the downward withdrawal of the guide pins through plate 102. Die plate 105 is thus suspended from plate 102, but is capable of limited vertical movement with respect thereto.

In the position of rest of Fig. 8, there is sufficient space between the block 97 and die plate 105 to permit the advancement of the paper therebetween. The timing of cams 115 is such that, after the paper has come to rest on block 97, push rods 103 raise the said block and the paper is scored by punches 104 pressing it into die grooves 107. The upward movement of the block raises die plate 105, but sufficient resisting pressure to such plate-lift for creasing the paper is obtained by the use of compression springs 108 set, at their upper ends, in wells in stationary bridge 96 and pressing down on the top of plate 105. After the operative stroke plate 105 is returned to normal position by springs 108, the amount of this motion being limited by the contact of nuts 106a on the upper side of bar 102.

Under some conditions, one of which will be later mentioned, it may be desirable to punch holes in the bottoms of the paper trays before completing them. For this purpose, punches 109 are provided (Fig. 8) which are adapted to punch suitable holes in the paper later forming the tray bottoms, at the same time that the paper is creased. The bodies of punches 109 headed at 109a, extend through stationary bridge 96 and are restrained against vertical movement with respect thereto by head-engagement with bridge 96 and by cap plate 110 bolted to the body of the bridge. The lower portions of the punches cooperate with dies 111 fastened in the movable bridge. The lower portions of the bores in dies 111 may be slightly undercut at 111a to give relief so that the punchings may drop on through and not clog up the dies. When such a punch and die arrangement is used, punches 109 extend downward sufficiently so that at the position of rest as indicated in Fig. 8 they extend into but not through registering apertures 105a in plate 105. Thus, after the punching operation, springs 108 move plate 105 downwardly, which strips the paper from punches 109 so that it is allowed to be pushed freely through and beyond die assembly 95 at the completion of the creasing and punching operations. Plate 105 thus has the dual function of a die block for punches 104 and a stripper for punches 109. The spring mounting of plate 105 instead of a rigid mounting makes for smooth operation by cushioning the shock of the die block impact and eliminates the necessity for fine adjustment of the die block lift.

After the paper has been operated on by die assembly 95, the next movement of the paper feed rolls advances the entire paper strip P, and the end thereof that has just been creased is thereby advanced into the path of the upwardly advancing forming blocks 14. To hold the paper when in this position, holders 120 (Figs. 1, 2, and 5) are provided, said holders comprising in part long narrow strips 123 which are fastened by integral flanges 124 to end formers 18, there being one such paper holder on each side of the paper strip P. Since these holders are similar I shall describe only one. At the end of the holder opposite to that at which the paper enters, there is riveted on top of strip 123 a similar strip 125 which lies thereon and by its own weight and a slight inherent spring action serves to grip the paper. The forward ends of strips 123, 124 are bent oppositely to provide a flaring mouth 123a in order to guide the paper in, should it be slightly out of horizontal alinement with the holder proper.

Up to this time sheet P has been uncut and its end, having been creased, is now held in position between end-formers 18 where it will be picked up by one of blocks 14. It is now necessary to cut off this creased end, giving it the proper dimensions to form a given sized tray. For this purpose cutter assembly 30 is provided. Though it lies within the scope of my invention to provide any suitable type of cutter, I shall now describe a preferred form. The cutter assembly is mounted on the vertical end faces of plates 23 and 24 toward forming blocks 14 (Figs. 2, 6 and 7). Attached to said vertical faces and spaced therefrom by spacers 129, are keepers 128. In the vertical slots thus formed by plates 23, 24 and keepers 128, is slidably held bar 127 to which all moving parts of the cutter assembly are attached by means of yokes 133. The details of the cutter bar assembly are shown enlarged in Fig. 7. Next to bar 127 is shim 130, then cutter blade 131, and, beside the cutter blade, another bar 132, shorter than bar 127 so that it may move vertically between end plates 23 and 24. All four of these members are carried and clamped together by yokes 133 which rest on top of pins 134 in push rods 135. Vertical reciprocatory motion is transmitted to yokes 133 by push rods 135 which are pivotally mounted on the outer or free ends of bell cranks 146 which, as may be seen in Figs. 2 and 4, are mounted to oscillate about shaft 148. Shaft 148 is journaled in brackets 149 on the top surface of base 10. Each of bell cranks 146 has a depending lower arm which is engaged by a cam 115; and it will be seen that as this engagement takes place the bell cranks are moved upwardly to rotate in a counterclockwise direction as viewed in Fig. 2. This motion is transmitted to the push rods which move vertically to raise yokes 133 and operate the cutter bar assembly.

Before, however, considering the cutter bar operation, I shall describe the means used to grip the paper during the process of cutting. Extending the full length of cutter blade 131 and carried above each of bars 127 and 132 are two gripping elements or bars 139 carried on guide pins 137 sliding in suitable bores in bars 127 and 132. Springs 138 surrounding pins 137 are seated in bars 127 and 132 and serve to keep the gripping bars normally above the top of the cutter blade when in the inoperative position of Fig. 7. This construction permits the gripping bars to be depressed below the cutting edge of blade 131 when necessary, as will be seen. Imbedded in and projecting above the top surface of each of bars 139 is a clamping strip 140, preferably of rubber or other resilient substance, which aids bars 139 to grip securely the sheet of paper P in a manner now to be set forth.

Spaced directly above gripping bars 127 an amount sufficient to allow the paper to pass between easily, are the stationary paper gripping and cutting elements comprising stationary bar 141, bolted to the vertical front faces of plates 23 and 24 at 142, and bar 144 parallel to and attached to bar 141. Bar 144 is spaced from bar 141 by means of spacer block 143 so that the former will be directly above bar 132 and one of the movable gripping elements 139. The thickness of spacer block 143 is normally but a small fraction of an inch for it should be only slightly wider than the thickness of cutter blade 131 since the slot 143a thus formed between stationary bars 141 and 144 is designed to take blade 131 with slight clearance on each side. In the drawings this clearance is exaggerated better to show up the structure. Clearance between blade 131 and bar 141 is secured by shim 130 which spaces the blade from bar 127; for it will be seen that bars 127 and 141 are both in contact with the end faces of plates 23 and 24 and are therefore in vertical alinement and it is therefor necessary to offset blade 131 horizontally from block 127.

It will thus be seen that as the cutter blade rises vertically, the paper is first gripped between the rubber strips on bars 139 and the undersurfaces of bars 141 and 144. This serves to hold the paper in place firmly and occurs before any cutting action takes place. As the blade moves farther up, springs 138 are compressed and pins 137 slide down into the bores in bars 137 and 142 allowing blade 131 to enter slot 143a The cutter blade has a saw toothed edge of an outline shown in Fig. 7a, beveled on one side so that there are a series of pointed teeth which first indent and then make small slits in the paper. Then, further insertion causes the teeth to enlarge the small slits until they meet and thus form a continuous cut and the paper is cut through. The cutting action is not so much one of shear as it is of perforation in which a few small slits are first cut, and then enlarged until they become one continuous cut along the entire width of the paper.

When the rotation of cam 116 permits downward motion of push rod 135, springs 147, which are attached to bars 132 and to base 10, insure a positive downward motion of the cutter assembly. As this downward motion occurs, the blade is withdrawn from the paper but the sheet P, now in two parts, is still gripped between the rubber strips 140 and the bars 141 and 144. This contact is maintained until the blade has been withdrawn below the top surfaces of bars 139 and springs 138 have been extended to their normal length. Additional downward movement of the cutter bar assembly returns it to the position of Fig. 7 and hence releases the gripping elements from their contact with the paper. The just detached sheet is now supported only on the paper holders 120 before mentioned. The sheet is rectangular and uncut, for it has not been cut or notched as an aid to forming the trays.

From this position the rectangular sheet of paper, now cut to the exact size required for one complete tray, is picked up by the forward face of a forming block 14, around and on which the tray is to be formed, and moved upward through the tray forming means. This motion pulls the ends of the paper sheet out of holders 120. The preferred embodiment of the tray forming means comprises two end-formers, generally indicated at 18 and mounted on base 10, one on each side of the path of upwardly moving blocks 14 and in horizontal alinement therewith, and the side-forming plates 19 and 20 carried one on each side of the upper portion of end-formers 18, all as shown in Figs. 1, 2, 3, 5 and 11 particularly. This assembly forms a box-like structure F (Fig. 3) with vertically extending walls between which blocks 14 are adapted to rise; said walls being adjacent to but spaced slightly from the vertical sides of blocks 14 as they move upward. Referring to Fig. 11, it will be seen that each of the end-formers is composed of a lower or base portion 150 which rests upon base 10, and an upper or vertical plate portion 151 which has a vertical face 151a so positioned as to permit one end of forming blocks 14 to pass adjacent thereto. These two portions are joined by a short inclined portion 152 and the entire structure strengthened by means of web 153. Passing through and supported by web 153 and the upper portion of base 150 are bolts 154 (Figs. 5 and 11) upon which are slidably carried side forming plates 19 and 20. It will be noted that in Fig. 11 the near plate 20 is omitted for the purpose of showing underlying structure. Plates 19 and 20 are resiliently pressed against the sides of end-formers 18 by means of compression springs 155 which will if necessary, permit plates 19 and 20 to be moved slightly away from end-formers 18, by the passage of a forming block therebetween. Plate portion 151 of each end-former has in it curved slots 157 which, in cooperation with notches 158 in inclined portion 152, serve to fold the ends of the tray in a manner later to be set forth. Fastened on the top of end-former 18 is a plate 160 (omitted from Fig. 11) so positioned that its vertical face forms a continuation of face 151a. The functions of this plate will be later discussed.

Plate 20 is one solid continuous plate supported only by the four bolts 154. Plate 19 on the other hand must permit the passage of arms 39 of brackets 15 and hence is divided into two similar parts 19' (Fig. 3) so horizontally spaced that arms 39 may pass between them. For convenience, however, the two parts will be referred together as a single side former 19. Each half 19' is carried by one of the end-formers but additional support is given at the free ends adjacent brackets 15 by means of compression springs 161 carried on pins 162 inserted into guide rails 63 of the body. These springs exert sufficient pressure against the inner ends of the two halves of plate 19 to keep them in position adjacent to the forming blocks. Plates 19 and 20 are somewhat irregularly shaped, the bottom edges 19b and 20b converging downwardly towards the center of the respective plates (Figs. 4 and 5). It will be appreciated that as a forming block 14 carrying a sheet of paper rises between plates 19 and 20 to form the tray side walls, the plates will first contact the paper at their lowermost points. Since the contact should be made on both sides of forming block 14 at the same instant, the points of plates 19 and 20 should be in the same horizontal plane. However, plate 20 has a single point 20a at the center of the block and plate 19 has two points 19a spaced on either side of the center, so different inclinations of the lower edges of the plates are necessary to make contact between the paper and both side-forming plates simultaneously. If one side were to touch sooner than the other, the paper would be pulled off block 14 toward that side.

I shall now describe the manner of folding the paper stock around the forming blocks to form the paper trays; and though for sake of illustration I shall describe the process for only one tray on a typical forming block, it will be understood that other trays are formed on successive blocks in an identical manner. It will also be understood that, though I later deal with the construction and functioning of the one typical forming block, all such description applies equally to the other forming blocks. Although I herein show and describe the forming blocks and the trays thereon as rectangular with sides and relatively shorter ends, such blocks and trays are not to be construed as limited to such relative dimensions. The vertical walls of the trays are referred to as sides or ends only for convenience of description, to locate one pair of opposite walls with respect to the other pair and to properly designate the means for forming the respective pairs of walls.

As before mentioned, carrier chain 13 advances at each movement the same distance as the distance between successive forming blocks, so that after each forward movement there will be a block in position A (Fig. 5), from which position the process of forming trays begins. The block 14 in position A has come to rest slightly below sheet P' which has just been severed from the paper strip P as described, said sheet being gripped at its ends by the paper holders 120. Plates 19 and 20 extend down to a point a short distance above the position of sheet P'. The next forward movement moves the block from A to B, during which time the sides and ends of the tray are folded down around the sides and ends of blocks by plates 19 and 20 and end-formers 18 respectively. At the beginning of this movement, the block comes up under sheet P' and lifts it from between holding clips 120. Before the sheet edges are released from clips 120, the block has contacted the flared points 19a and 20a of plates 19 and 20 respectively (Fig. 1), so that the paper is held against the block; and at no time is the paper entirely free to move since if it were, it might not be squarely positioned on block 14. Further upward movement of block 14 past the side forming plates folds the paper along the sides of the forming block, the folding starting at the center and working evenly towards the ends of the block. It is in this connection that the advantage of scoring or precreasing the paper becomes apparent since there is now a natural tendency for the sides to be folded along the creases and this aids in keeping the paper alined on block 14. By the time the block is approximately midway between positions A and B the partially formed tray is of channel transverse cross-section, i. e., the tray sides are folded against the forming block but the stock that is to form the ends is still projecting beyond the ends of block 14 in the horizontal plane of the tray bottom. At this time the paper is held in position by the side forming plates 19 and 20, which, since they fit closely, may have moved out against springs 155 and 161 if necessary to accommodate the block and paper. It will be understood from the foregoing that the tray is being formed in an inverted position, that is the sides are folded down instead of up. In the normal position said sides and ends, yet to be formed, form vertical walls around and rising from the horizontal portion constituting the tray bottom.

The next step is to fold the tray ends against the forming block and this is done by the vertical faces 151a of end formers 18. Three successive steps in the folding are illustrated in Fig. 11, but it will be understood that the positions shown are successive positions of the same tray, for the positions shown are not occupied simultaneously by successive blocks 14. The lowest tray T of that figure shows the block just after engaging face 151a and with the tray end being folded thereby against the end surfaces of block 14. When the forming block has come to rest at position B of Fig. 5, the block has risen to a point where the tray ends are completely folded down and are held against block 14 by faces 151a. It will be noted that this operation forms from the excess paper stock, i. e. the part not needed for the tray sides and ends proper, a triangular flap 165 of paper of double thickness at all four tray corners and that said flaps project beyond the ends of block 14 in the plane of the tray sides, or in other words they lie along the side-forming plates. Notches 158 are provided in end-formers 18 to allow the free formation and upward passage of these flaps, since plate portion 151 must be the full width of the forming block to fold completely the ends and crease the corners sharply and accurately.

During the passage of the forming block from position B to position C (Fig. 5) where it again comes to rest, the four corner flaps 165 are folded over against the ends of the tray. Though this folding and the subsequent fastening of only the one flap illustrated in Fig. 11 will be described, it will be understood that all four flaps are folded simultaneously and in a similar manner. This folding is done by means of curved slots 157 opening at their lower ends to the opposite edges of plate 151 (Figs. 1 and 11). Each slot 157 curves upwardly and inwardly toward central web 153. Suitable means, such as the following, is provided to guide a given flap 165 into an associated slot 157 during the movement of block B to the position of the middle tray U in Fig. 11. Projecting outwardly from the side edge of plate 151 at and above a point in horizontal alinement with the top of slot opening or mouth 157a, are vertical flanges 166 that provide bearing surfaces on the end formers for side-forming plates 19, 20 as shown in perspective in Figs. 11 and 12. The bottom edge 166a of this flange is beveled to conform with the curvature of slot 157. Just below this bevel is an aperture 167 in the adjacent side-forming plate. A thin leaf spring 168 attached to the outside face of the side-forming plate extends through aperture 167 and over bevel 166a for a short distance up the inside face of flange 166. This guide spring positively prevents flap 165 from going between flange 166 and the side plate. During the upward movement of block 14, flap 165 is guided into slot 157 by spring 168, as shown by the tray U of Fig. 11, and, starting at the tray corner is progressively pressed over against the tray end by the combined effect of the vertical motion of the block and the curvature of the upper defining wall or forming face 157' of the slot. The flap is thus bent along the vertical line where it joins the tray corner and is folded over the tray end with the tip of the flap toward the tray center. In position C of the forming block, corresponding to position W of the tray, the formation of the tray has been completed, and the two flaps at each end are held pressed in place by plates 160 (Fig. 5). It will be appreciated from the foregoing that the end-formers consist essentially of a plate portion, adapted to fold the tray end against the forming block, and curved forming faces or members, adapted to fold the corner flaps over against the tray end, and means to support these elements in the path of the paper extending beyond the forward face of the forming block, here illustrated as moving vertically.

While the tray is stationary in position W, flaps 165 are simultaneously fastened to the tray ends. This operation is performed by four punch assemblies generally indicated at 170, (Figs. 3, 6, 9 and 10), two punches being mounted on each plate 171 which plates are supported so as to be adjacent opposite ends of the tray when in position W. Plates 171 are attached, one each, by screws 172 to arms 173a of brackets 173 which are adapted to be reciprocated toward and away from the ends of the forming block by being moved along their supporting rods 175 and 176 which are carried on and between frame plates 23 and 24. Each bracket 173 has a sleeve that slides along rod 175, and an arm 173b, terminating in a fork (Fig. 6), that slides along rod 176. This arrangement prevents rotation of brackets 173 about rod 175 and so keeps the punches on arm 173a correctly positioned vertically with respect to forming block 14. Rod 176 is preferably rectangular with the forked arm 173b engaging but three sides thereof so that minor inaccuracies in the distance between rods 175 and 176 do not misaline the punches or cause parts to bind.

Brackets 173 are adapted to be moved simultaneously toward the forming block by connecting rods 178 and 179 (Figs. 3 and 4) attached to lugs 173c depending from brackets 173. At their other ends the connecting rods are connected respectively to throws or cranks 181 and 182, spaced 180° apart, on crank shaft 180. Crank shaft 180 is journaled in bearing 183, integral with plate 24. The crankshaft is driven through bevel gear 185 keyed thereto and meshing with gear 186 on one end of shaft 187 journaled in bracket 188 attached to plate 24. At the opposite end of shaft 187 is attached sprocket 75 driven by chain 74 (Figs. 2 and 3) as above described. The gear ratios are such that each time star wheel 81 is moved by crank 55, crankshaft 180 and cranks 181, 182 are rotated one full revolution from the position of Figs. 3 and 4. During the first half revolution of shaft 180, crank 181 draws connecting rod 178 to the right, as viewed in Fig. 4, and crank 182 pushes connecting rod 179 to the left, thus simultaneously moving brackets 173 and punches 170 thereon toward forming blocks 14; and during the second half revolution the brackets and punches move away from forming blocks 14.

Figure 9:
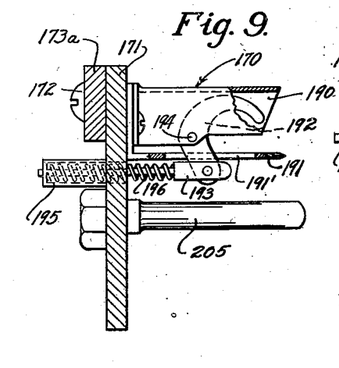
Fig. 9 is an enlarged side elevation of the end-fastening punches as taken along the line 9—9 of Fig. 6.

This horizontal motion of brackets 173 actuates punches 170 and fastens flaps 165 to the ends of the tray. Punches 170 are shown in greater detail in Figs. 9 and 10. Each punch is of the general type disclosed in Patent No. 1,065,903 issued to George P. Bump on June 24, 1913, though having certain novel features. Each punch assembly 170 comprises tongue punch 190 and slitter 191 mounted directly upon plate 171, and a semi-circular tucking finger 192 pivotally mounted on pin 194 near the lower edge of tongue punch 190. Punch 190 as viewed in Fig. 9 is approximately the shape of an inverted U, with tucker 192 pivoted between and near the bottom of the depending legs. This punch is adapted to cut in the paper a tongue that is somewhat wider at the base where it is attached to the paper than at the tip, which is preferably rounded off. Slitting blade 191 is a flat pointed strip adapted to cut a slit in the paper directly beneath the base of the tongue cut by punch 190, the slit so cut being slightly wider than the base of the tongue to permit insertion of the tongue therethrough as will be described. The lower end of the tucking finger extends through a longitudinal slot in slitter 191 and is connected to plunger 193. Cylindrical housing 195 mounted upon plate 171 serves as a guide for one end of plunger 193 and as a well to receive compression spring 196 mounted on plunger 193 to hold the plunger extended whereby tucker 192 is withdrawn into punch 190 as in Fig. 9.

There are also provided die plates which will cooperate with punch 190 and slitter 192. Since the blocks 14 are preferably of cast material it is preferable to provide a suitably tempered die plate 198 (Figs. 1 and 2) on each end of the forming blocks. Die plates 198 have die apertures 199 adapted to cooperate with punch 190 and slitter 191 in the formation of the paper fastening tongue. Behind apertures 199 are cavities in the forming block so that the tongue punch may pass through the plate 198 without interference. In position C, where the end fastening operation is performed, the end flaps 165 are held pressed against die plate 198 on each end of the forming block by associated plate 160 in which are provided apertures 200 and 201 (Fig. 2) said apertures registering with aperture 199 in die plate 198. Plates 160 and 198 are shown diagrammatically in Fig. 10 in this relative position, the paper P' being shown held between the two plates, all three thicknesses of the paper that actually occurs at the corner (one thickness for the tray end and a double thickness for the flap 165) being represented in this figure by a single thickness.

At each end of the forming block 14 are two depending lugs having bores 203 (Figs. 1 and 2) which are adapted to receive pilots or positioning pins 205 mounted upon plate 171, when the punches move into operating position. Punch assemblies 170 are positioned on plate 171 in the same relation to guide pins 205 that apertures 199 are positioned on the forming block with relation to guide bores 203. Holes 204 are also provided in plate 160 in order to permit passage of said guide pins. Pins 205 extend horizontally from plate 171 somewhat farther than punch 190 and consequently, as the plate 171 moves toward the forming block, pins 205 enter bores 203 before punch 190 strikes the paper. This insures alinement of the punch and die plates. This alining means is provided since the forming block might accidentally fail to stop at the correct position, and, in the absence of alinement means, punch 190 would then strike die plate 198 with resultant damage to the punch.

Figure 10:
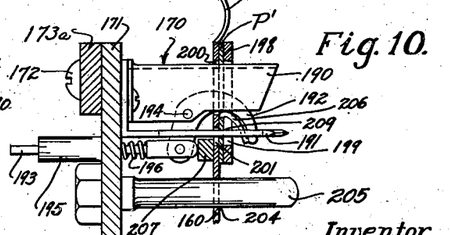
Fig. 10 is a view similar to Fig. 9 but with certain parts in changed position and with certain additional associated parts shown in active co-operation therewith.

I shall now describe the method of cutting a tongue in the paper whereby the flaps 165 are fastened to the tray ends; particular reference being had to Fig. 10, which shows the punch in the position of rest, and Fig. 11 which shows the punch at the end of the operative movement toward the forming blocks. As punch 170 advances toward the tray, pins 205 first enter bores 203, and then tongue punch 190 and slitting blade 191 enter the paper simultaneously; paper tongue 206 and slit 209 are thus cut through the three thicknesses of paper, the lower end of the tongue remaining integral with the paper. Shortly after punch 190 has fully entered the paper, the front end of plunger 193 comes in contact with bumper bar 207 which is carried on angle bracket 208 mounted on top of end-former 18 as shown in Figs. 2 and 5. This engagement causes plunger 193 to be held relatively stationary and continued movement of member 171 causes tucking element 192 to pivot about pin 194. This pivoting causes the finger 192 to tuck tongue 206 through the slot 191' in blade 191 as is shown in Fig. 10. As the punch is withdrawn, plunger 193 is temporarily held relatively stationary by the expansion of spring 196 and so tucking finger 192 rotates in a reverse direction to return to its normal position of rest. This leaves tongue 206 remaining in the slot in blade 191 and consequently as the slitter is withdrawn through the paper, the free end of tongue 206 is taken with it and thus drawn through the slit 209. Thus at each corner of the tray a tongue of paper is cut through three thicknesses of paper, bent through 180°, and the tip of said tongue is withdrawn through an adjacent slit in the tray paper whereby each flap is locked to the end of the tray. Plates 160 serve to hold flaps 165 against the forming block when it is in position C. Suitable apertures are provided in the plates to permit the punches to operate through them, so that when the punches are withdrawn from the paper, the plates act as stripping plates to remove the paper from the punch elements.

The tray ends having been fastened, the tray is now ready to be moved on from position C. This must be accomplished without injury to the tray fastenings. It will be appreciated from Fig. 10, that the end of the tray is no longer a smooth surface but that tongues 206 and the slits through which they pass might catch and tear on the edges of apertures 200 and 201 in tightly pressed plates 160. To avoid this, there is on the top of each plate 160 a central tab 160a (Figs. 2, 3, 5 and 10) bent convexly toward the forming block. As the forming block then moves upwardly from position C, it will come in contact between flaps 165 with the near face of tab 160a and, in order to pass thereby, it must force this tab outward. Plate 160 is made resilient to permit this displacement and then return to its proper position. Thus tongues 206 are safeguarded against injury as is apt to happen were they slid along the surface of plate 160 over apertures 200 and 201.

There now remains to be described only the means for stripping the completed tray from the forming block and removing said tray from the machine. The mechanism for accomplishing this operation is carried upon a pair of horizontal rods 210 (Figs. 1, 2, 3 and 6) extending from the side plate 12b of body 12 and supported at their outer ends in joint sockets 212 carried at the ends of rods 211 which extend upwardly and outwardly from the end of base 10. Spaced sufficiently from the machine body to permit the passage of forming blocks 14, is a pair of vertically extending standards 213 supported on rods 210. Extending between and journaled in standards 213, is a roller 214, while a similar roller 215 extends between and is journaled in sockets 212. Extending around said two rollers is a discharge conveyor belt 216 which is a preferred means for discharging the completed trays from the machine. Discharge belt 216 is driven by means of a chain 218 which passes over a sprocket 217 on an extension of roller shaft 214a and over drive sprocket 219 keyed to shaft 31. Belt 216 is thus intermittently operated, being moved forward (to the right of Fig. 2) each time arm 55 drives star wheel 56, as before described.

The preferred means for stripping the finished trays from the forming block 14 includes shaft 220 journaled at the tops of standards 213 and the attached pair of approximately horizontal arms 221. Shaft 220 extends beyond standard 213, preferably on the side of the machine shown in Fig. 1, and on this extension is fastened a short arm 222 at the outer end of which is attached rod 223. This rod slides in a guide 224 attached to body 12. Appropriately positioned along rod 223 and attached thereto is finger 225 adapted to be engaged and lifted by pin 226 on the inner side of gear wheel 54. Thus every revolution of the gear wheel 54 raises rod 223 and by means of arm 222 oscillates arms 221 through a vertical arc. Continued rotation of wheel 54 causes finger 225 to slip off pin 226; and the down or return movement of rod 223 is insured by the use of compression spring 228 thereon which seats against a nut on the end of rod 223 and against guide 224.

The balance of the tray stripping mechanism is on the forming block and consists of a pair of flat stripper bars 230, (Fig. 5) recessed in and normally flush with the top surface of the forming block, to which bars are attached plunger rods 231 that extend through and beyond the forming blocks, these plungers being held normally in extended position to seat bars 230 in the block by means of compression springs 232. The plungers are positioned one near each end of the forming block and are adapted to be engaged by arms 221 when the block is in position E of Figs. 1 and 2. Thus when the block has come to rest in position E, pin 226 on gear 54 engages finger 225 and lifts rod 223, thereby depressing arms 221 which strike and depress plungers 231 and attached bars 230 (see block E in Fig. 1), which bar movement strips the completed tray from the forming block.

During this stripping operation, which takes place rapidly, there is a tendency to create a slight vacuum between the tray and the forming block, for the tray fits rather tightly around the block. Since it is desirable to relieve this vacuum which hinders easy and rapid stripping, vent holes are provided either in the tray, as was mentioned above in connection with the punch mechanism 95, or in the forming block. For instance, holes 233 (Fig. 5) may be provided through blocks 14 for this purpose.

When removed from the forming block in the position E as just described, the trays fall upon a slide 235, here shown as comprising two arms, which is mounted upon a shaft 236 (Figs. 1, 2 and 3) journaled in standards 213. Moving down said slide by force of gravity, the trays are deposited on discharge belt 216, as shown in Fig. 1, which serves to remove them from the machine to any desired place.

Since slide 235 is directly beneath the forming block in position E, it must be moved from the path of the block during the time that the blocks are in motion. This is accomplished by raising arm 237 attached to one end of shaft 236, thus rotating shaft 236 and slide 235 to the position shown in Fig. 6 where it is clear of the path of forming blocks 14. Arm 237 is raised by engagement with arcuate cam 238 fastened on the outside rim of gear 54 and adapted to raise the arm 237 from the position of Fig. 1 to the position of Fig. 6 where it is retained as long as the arm rides upon said cam, but after the passage of said cam, the arm will fall by gravity to the position of Fig. 1 during the period of rest of chain 13. Cam 238 is positioned to raise arm 237 just before chain 13 starts to move and is long enough to hold slide 235 up during this movement. After slide 235 has returned to operative position, pin 236 engages finger 225 and a stripping operation occurs.

Adjustably mounted near one end of shaft 236 is a short arm 239 carrying stop pin 240 adapted to be engaged by upright 213 to limit adjustably the rotation of shaft 236 so that when arm 237 drops down after being released from arcuate cam 238, slide 235 will be in the proper position to pick-up the tray as it is dropped off the forming block.

Having described in detail the functions and structure of the various elements of my machine, it is thought that a better understanding of the coordination and timing of the various operations may be secured by discussing generally the grouping of elements and then by following the passage of a single sheet of stock through the several steps of being formed into a tray, without mention of structural details. It will be seen that the moving parts may be classified in three main groups according to their individual drives. The first group comprises the articulated carrier or conveyor means intermittently driven by arm 55 through star wheel 56, for passing the sheet through the tray forming means and consists mainly of the chain 13 and forming blocks 14. The second group comprises those parts intermittently driven by arm 55 through star wheel 81 and includes the feed rolls 25 and 26 and punches 170 carried upon the two brackets 173. The third group is made up of the elements driven by the continuously rotating sprocket 119 on shaft 34, and consists of cutter bar assembly 30 and creasing die assembly 95. Obviously, elements of either the first or second group must of necessity remain stationary while the elements of the other group are being operated since both groups are operated in turn by arm 55. Elements of the third group might be operated by a third star wheel so positioned as to be actuated after star wheel 86, but it has been found from experience that the method of driving the elements of the third group by a continuous drive of the general form shown is preferable; though the elements of this last group are so timed by the location of cam 115 as to operate after crank 55 disengages star wheel 81 and before it engages star wheel 56.

Examination of the machine discloses the fact that for each complete revolution of driving arm 55 a finished tray is produced. This means that some time during a given revolution of this arm each and every operation connected with the making of the tray has been carried out once and hence one revolution of this arm may be considered as being a complete operative cycle. It should be borne in mind, however, that at any one time successive trays are present in the machine in the several stages of making and that although one tray is completed for every cycle of the machine, it takes several cycles to complete any single given tray.

I shall now describe the progress of a single given sheet through my machine, starting with the time in the operative cycle when arm 55 rotates star wheel 81 to drive chain 74 and thus rotate rolls 25, 26 through one complete revolution which feeds a properly measured length of the paper strip P into the creasing die assembly 95. After arm 55 clears wheel 81 to bring the paper to rest in the die, cam 115, due to the continuous rotation of shaft 116 by sprocket 117, has rotated to the position where it actuates push rods 103 which lift punch block 97 and thereby cause dies 104 to press longitudinal creases into the paper where the sides are to be folded. The next operation on this section of paper does not take place until the beginning of the successive cycle, when paper strip P is again fed by rolls 25 and 26, thus forcing said section ahead the exact amount required for a single tray. Said section is then gripped by paper holders 120. The next succeeding operation upon the paper is the severing of said section from main strip P. This operation is again a function of cam 116 which, before it operates push rods 102, operates bell crank 146 to actuate the cutter bar assembly, thereby cutting off said section which is now a separate rectangular sheet cut to size for a single tray and gripped by holders 120 in position to be picked up by the forming blocks.

From this position, begins the actual formation of the tray by folding around the forming blocks 14 which belong to the first group of moving parts as above defined. A given forming block in position A (Fig. 5) is moved to position B when arm 55 rotates the star wheel 56. During its travel to the second position, the block picks up the paper from the paper holders 120 and carries it between the side-forming plates which fold over the tray sides and into the lower parts of the end-formers which fold over the tray ends. The next time driving arm 55 moves star wheel 56 the forming block is moved from position B to position C during which travel the corner flaps 165 are folded over by passage through slots 157, the flaps being held against the ends of the tray by means of the spring plates 160.

Just after the forming block has come to rest in position C, the driving arm 55 passes to star wheel 81 and, at the same time that a subsequent sheet is fed into the creasing die, sprocket 75 is rotated so as to drive crank shaft 180 one complete revolution. This moves the punches toward and away from the forming block and thereby cuts and withdraws through the paper, tongues 206 which serve to fasten flaps 165 against the tray ends. The next three times that arm 55 rotates star wheel 56 accomplishes nothing in the formation of the given tray except to move the forming blocks from position C to position E at which place the completed tray is stripped from the forming block and, after sliding down slide 235, is removed from the machine on belt 216.

Slide 235 has been in operative position. Cam 238 is so placed as to remove the slide from the path of the forming blocks during their movement. The stripping operation is independent of any other operation and may be performed at any time slide 235 is in place, though preferably just after it drops into position.

It will be understood that the drawings and description are to be considered merely as illustrative of and not restrictive on the broader claims appended hereto, for various changes in design, structure, and arrangement may be made without departing from the spirit and scope of said claims. Thus, though I refer in the following claims to paper as the tray material, I do so to conveniently refer to the sheet material used, for it will be appreciated that any suitable sheet material may be used in a tray making machine constructed in accord with my invention.

I claim:—

1. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, means for moving the block through its path whereby the forming plates engage the extending paper to press it toward the side faces of the block; said forming plates comprising side formers adapted to form the tray sides, end formers adapted to form the tray ends, said side and end formers leaving double thickness flaps of excess stock extending at the tray corners substantially in the plane of the tray sides, and means on said end formers effective subsequently to fold the flaps against the tray ends; means to punch slits through and tongues from the flaps and end stock where they overlap, and means to withdraw said tongues through said slits and thereby secure the flaps to the tray ends.

2. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, and means for moving the block through its path whereby the forming plates engage the extending paper to press it toward the side faces of the block forming at the tray corners double thickness flaps of excess paper, and means to fasten the double thickness flaps to the tray ends; said fastening means comprising a slotted slitting punch to cut a slit through a flap and the underlying tray end, a tongue punch to cut a tongue from said flap and tray end, and a tucking finger to tuck the tongue through the slitter so that the withdrawal of the slitter from the slitted flap and end draws the tongue through said slit to secure the flap to the tray end.

3. In a machine for forming trays from sheets of paper, a forming block movable through a predetermined path, said block being adapted to support a sheet of paper on its forward face, the paper being of a size to extend beyond the edges of the block, side forming plates and end forming plates arranged in the path of the extending paper as carried by the block, means to move the block through its path whereby the forming plates engage the extending paper to press it toward the side faces of the block, and means to secure the tray sides and ends together at the tray corners, and means to strip the completed trays from said forming block; said stripping means embodying a member at the forward face of the block and movable outwardly therebeyond, and means so to move the member.

4. In a machine for forming trays from sheets of paper, a forming block movable through a predetermined path, said block being adapted to support a sheet of paper on its forward face, the paper being of a size to extend beyond the edges of the block, side forming plates and end forming plates arranged in the path of the extending paper as carried by the block, means to move the block through its path whereby the forming plates engage the extending paper to press it toward the side faces of the block, means to secure the tray sides and ends together at the tray corners, and means to strip the completed trays from said forming block; said stripping means comprising bars at the forward face of the block and movable outwardly therebeyond, plungers extending through the block attached to said bars, and members arranged adjacent to the path of the block, said members being adapted to strike the plungers to move the bars beyond the forward face of the block.

5. In a machine for forming trays from sheets of paper, a forming block movable through a predetermined path, said block being adapted to support a sheet of paper on its forward face, the paper being of a size to extend beyond the edges of the block, side forming plates and end forming plates arranged in the path of the extending paper as carried by the block, means to move the block through its path whereby the forming plates engage the extending paper to press it toward the side faces of the block, means to secure the tray sides and ends together at the tray corners, and means to strip the completed trays from said forming block, said stripping means embodying a bar at the forward face of the block and movable outwardly therebeyond, a plunger extending through the block attached to said bar, and an actuating member arranged adjacent to the path of the block, said actuating member being movable into and out of the path of said block and adapted, when in the path of said block, to strike the plunger to move the bar beyond the forward face of the block.

6. In a machine for forming trays from sheets of paper, a forming block movable through a predetermined vertical path, said block being adapted to support a sheet of paper on its forward face, the paper being of a size to extend beyond the edges of the block, side forming plates and end forming plates arranged in the path of the extending paper as carried by the upwardly moving block, means to move the block through its path whereby the forming plates engage the extending paper to press it toward the side faces of the block, means to secure the tray sides and ends together at the tray corners, and means to strip the completed trays from said downwardly moving forming block; said stripping means comprising bars at the forward face of the block and movable outwardly therebeyond, plungers extending through the block attached to said bars, and members arranged adjacent to the path of the downwardly moving block, said members being adapted to strike the plungers to move the bars beyond the forward face of the block.

7. In a machine for forming trays from sheets of paper, a forming block movable through a predetermined path, said block being adapted to support a sheet of paper on its forward face, the paper being of a size to extend beyond the edge of the block, side forming plates and end forming plates arranged in the path of the extending paper as carried by the block, means to move the block through its path whereby the forming plates engage the extending paper to press it toward the side faces of the block, means to secure the tray sides and ends together at the tray corners, and means to strip the completed trays from said forming block; said stripping means embodying a member at the forward face of the block and movable outwardly therebeyond, means so to move the member, and a delivery slide disposed adjacent to the path of the advancing block and adapted to receive the stripped tray from the block.

8. In a machine for forming trays from sheets of paper, a forming block movable through a predetermined path, said block being adapted to support a sheet of paper on its forward face, the paper being of a size to extend beyond the edges of the block, side forming plates and end forming plates arranged in the path of the extending paper as carried by the block, means to move the block through its path whereby the forming plates engage the extending paper to press it toward the side faces of the block, means to secure the tray sides and ends together at the tray corners, and means to strip the completed trays from said forming block; said stripping means embodying a member at the forward face of the block and movable outwardly therebeyond, means so to move the member, and a delivery slide disposed adjacent to the path of the advancing block and movable into and out of the path of the block, and adapted, when in the path of the block, to receive the stripped tray from the block.

9. In a machine for forming trays from sheets of paper, means for creasing the paper to outline a portion, at least, of a tray bottom, a forming block movable through a predetermined path, said block being adapted to support a sheet of paper on its forward face, the paper being of a size to extend beyond the edges of the block with the creases in the paper overlying the edges of said forward face, forming plates arranged in the path of the extending paper as carried by the block, means for moving the block through its path whereby the forming plates engage the extending paper to bend it at the creases and press it toward the side faces of the block; said forming plates comprising side formers adapted to form the tray sides, end formers adapted to form the tray ends, said side and end formers leaving double thickness flaps of excess stock extending at the tray corners substantially in the plane of the tray sides, and means on said end formers to fold the flaps against the tray ends; means to fasten the flaps to the tray ends, means to strip the completed tray from the forming block; said stripping means embodying a member at the forward face of the block and movable outwardly therebeyond, and means so to move the member; and a delivery slide disposed adjacent to the path of the advancing block and adapted to receive the stripped tray from the block.

10. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, and means for intermittently moving the block through its path whereby the forming plates engage the extending paper to press it toward the side faces of the block; said forming plates comprising side formers adapted to form the tray sides, end formers adapted to form the tray ends, said side and end formers leaving double thickness flaps of excess stock extending at the tray corners substantially in the plane of the tray sides, and means on said end formers effective subsequently to fold the flaps against the tray ends; and reciprocating punches adapted to fasten the flaps to the tray ends while said block is at rest after passing through said forming plates.

11. In a machine for forming trays from sheets of paper, a frame, an articulated carrying and forming member movable through a predetermined path, forming blocks on said articulated member adapted to receive and support sheets of paper on their forward faces, the paper being of a size to extend beyond the edges of the forming blocks, stationary forming plates arranged in the path of the extending paper as carried by the blocks, driving means for intermittently moving said articulated member whereby the forming plates engage the extending paper to press it toward the side faces of the blocks to form tray walls having flaps of double thickness at each corner, and reciprocating punches adapted to fasten the flaps to the tray walls while the forming blocks are at rest after passing the forming plates.

12. In a machine for forming trays from sheets of paper, a frame, an articulated carrying and forming member movable through a predetermined path, forming blocks on said articulated member adapted to receive and support sheets of paper on their forward faces, the paper being of a size to extend beyond the edges of the forming blocks, stationary forming plates arranged in the path of the extending paper as carried by the blocks, driving means for intermittently moving said articulated member whereby the forming plates engage the extending paper to press it toward the side faces of the blocks to form tray walls having flaps of double thickness at each corner, reciprocating punches adapted to fasten the flaps to the tray walls, and means for stripping the completed trays from the blocks, the punches and stripping means being actuated by said driving means while the forming blocks are at rest.

13. In a machine for forming trays from sheets of paper, a frame, an articulated carrying and forming member movable through a predetermined vertical path, forming blocks on said articulated member adapted to receive and support sheets of paper on their forward faces, the paper being of a size to extend beyond the edges of the forming blocks, stationary forming plates arranged on the upwardly moving side of the articulated member in the path of the extending paper as carried by the blocks, driving means for moving said articulated member whereby the forming plates engage the extending paper to press it toward the side faces of the blocks to form vertical tray walls, means to fasten adjacent tray walls together at the corners, and tray stripping means to strip the completed trays from the blocks comprising bars at the forward face of the block and movable outwardly therebeyond and means disposed on the downwardly moving side of said articulated member to so move the stripping bars.

14. A machine for forming trays from sheets of paper comprising means carrying the sheet through a predetermined line of travel and acting to fold the edges of the sheet into tray walls and multiple thickness overlapping portions in planes parallel to the line of travel and means approaching and acting on the so formed tray in a line of action transverse to the sheet line of travel to secure together the tray walls and multiple thickness portions, said securing means comprising means to punch slits through and tongues from the walls and multiple thickness portions and means to withdraw the tongues through the slits.

15. In a machine for forming trays from sheets of paper, a tray forming well, a forming block adapted to carry a sheet of paper through the forming well to form tray walls, means to intermittently advance the forming block, a reciprocating punch operating in a direction transverse to the motion of the forming block, said punch being adapted to cut an interlocking tongue from the tray wall to fasten the walls together, and means to actuate said punch during a rest period of the forming block.

16. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, means for moving the block through its path whereby the forming plates engage the extending paper to press it toward the side faces of the block to form vertical tray walls and double thickness flaps folded over against said tray walls, and means to fasten the double thickness flaps to the tray walls comprising means to punch slits through and tongues from the flaps and underlying tray walls and means to withdraw the tongues through the slits to secure the flaps to the tray walls.

17. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, means for moving the block through its path whereby the forming plates engage the extending paper to press it toward the side faces of the block to form vertical tray walls and double thickness flaps of paper at each tray corner overlying said tray walls, and a reciprocating punch at each of the tray corners adapted to punch slits through and tongues from the tray walls and overlying double-thickness flaps and to withdraw said tongues through the slits and thereby secure the flaps to the tray walls.

18. In a machine for forming trays from sheets of paper, a forming block movable through a predetermined path, said block being adapted to support a sheet of paper on its forward face, the paper being of a size to extend beyond the edges of the block, forming plates arranged in the path of the extending paper as carried by the block, means for moving the block through its path whereby the forming plates engage the extending paper to press it toward the side faces of the block, said forming plates being adapted to form tray walls and multiple thickness flaps of excess paper overlying the tray walls, and means to fasten the flaps to the tray walls; said fastening means comprising apertured die plates on the forming block, stationary apertured stripping plates on the forming plates, the stripping plates being positioned to hold said flaps against the tray walls after folding, reciprocating punches passing through apertures in the stripping and die plates to cut slits in and tongues from the tray walls and overlying flaps and to withdraw the tongues through the slits to secure the flaps to the tray walls, and aligning means on the punches to align the apertures in the stripping and die plates with the reciprocating punches.

19. In a machine for forming trays from sheets of paper, said trays having double thickness flaps of excess paper folded against the tray walls, means to fasten the double thickness flaps to the tray walls comprising means to punch slits through and tongues from the flaps and tray walls and means to withdraw the tongues through the slits to secure the flaps to the tray walls.

20. In a machine for forming trays from sheets of paper, said trays having double-thickness flaps of excess paper folded against the tray walls, means to fasten the double-thickness flaps to the tray walls comprising a slotted slitting punch to cut a slit through a flap and the underlying tray wall, a tongue punch to cut a tongue from said flap and tray wall, and a tucking finger to tuck the tongue through the slitter so that the withdrawal of the slitter from the slitted flap and tray wall draws the tongue through said slit to secure the flap to the tray wall.

21. In a machine for forming trays from sheets of paper, said trays having double-thickness flaps of excess paper folded against the tray walls, means to fasten the double-thickness flaps to the tray walls comprising an apertured die-plate within the tray wall and movable therewith, a stationary apertured stripping plate positioned to press against the outside of the tray wall to hold a flap against the tray wall after folding, a reciprocating punch passing through the apertures in the stripping and die plates to cut a slit in and a tongue from the wall and flap and to withdraw the tongue through the slit to secure the flap to the tray wall, and aligning means on the punch to align the apertures in the stripping and die plates with the punches.

22. In a machine for forming trays from sheets of paper, a movable sheet carrying block advanced through a closed circuit, tray forming plates arranged adjacent the moving block, a movable stripper carried on the block adapted to move outwardly against the bottom of the tray so formed, and intermittent means to engage and actuate the stripper at a given point in the path of the block.

23. In a machine for forming trays from sheets of paper, a movable sheet carrying block advanced through a closed circuit, tray forming plates arranged adjacent the moving block, means to intermittently move the block, a movable stripper carried on the block adapted to move outwardly against the bottom of the tray so formed, and intermittent means to engage and actuate the stripper at a given point in the path of the block, said stripper actuating means being operative during a rest period of the block.

24. In a machine for forming trays from sheets of paper, a series of forming blocks movable successively through a predetermined closed path, paper folding plates arranged adjacent the path of the blocks, each of said blocks being adapted to support a sheet of paper on its forward face and to move said sheet past the folding plates to form a tray about said block, and means to strip the completed trays from said forming blocks; said stripping means embodying a member carried by and recessed at the forward face of each of the blocks and movable outwardly therebeyond, and means so to move the members, comprising an arm adjacent the path of the blocks and intermittently movable into the path of the blocks to engage successively said members.

25. In a machine for forming trays from sheets of paper, a tray forming member adapted to fold a portion of a sheet of paper to form a tray wall and overlying flaps of excess paper, said member comprising an arcuately slotted plate positioned to engage the sheet to form a tray wall, said arcuate slots opening at one end at opposite sides of the plate and each being adapted to receive at the open end a flap of paper, the slots curving together toward the center of the plate to provide curved edges for folding the flaps of paper over against said tray wall as the sheet is moved past the tray forming member.

26. In a machine for forming trays from sheets of paper, a tray forming member adapted to fold a portion of a sheet of paper to form a tray wall and overlying flaps of excess paper, said member comprising a vertically extending, arcuately slotted plate positioned to engage the vertically moving sheet to form a tray wall, said arcuate slots opening at their lower ends to opposite vertical edges of the plate and each being adapted to receive at the open end a flap of paper, the slots curving upwardly towards the center of the plate to provide curved edges for folding the flaps of paper over against said tray wall as the sheet is moved upwardly past the tray forming member.

27. In a machine for forming trays from sheets of paper, a frame, an articulated carrying and forming member movable through a predetermined path, forming blocks on said articulated member adapted to receive and support sheets of paper on their forward faces, the paper being of the size to extend beyond the edges of the forming blocks, means for moving successive sheets of paper into the path of the forming blocks, stationary forming plates arranged in the path of the extending paper as carried by the blocks, said forming plates comprising a pair of side forming plates for forming the tray sides and a pair of slotted end forming plates for folding the tray ends, said side and end forming plates leaving double-thickness flaps of excess stock extending at the tray corners substantially in the plane of the tray sides, each end forming plate having a pair of arcuate slots opening adjacent the side forming plates and converging towards the center of the end forming plate to receive and fold over the tray ends the double-thickness flaps, means for moving the blocks through their path whereby the forming plates engage the extending paper to press it towards the side faces of the blocks to form vertical tray walls, means to fasten the flaps to the tray ends, and means to strip the completed tray from the forming blocks.

28. In a machine for forming trays from sheets of paper, a frame, an articulated carrying and forming member movable through a predetermined path, forming blocks on said articulated member adapted to receive and support sheets of paper on their forward faces, the paper being of the size to extend beyond the edges of the forming blocks, means for moving successive sheets of paper into the path of the forming blocks, stationary forming plates arranged in the path of the extending paper as carried by the blocks, driving means for moving said articulated member whereby the forming plates engage the extending paper to press it towards the side faces of the blocks to form tray walls, means for fastening the tray walls together, and means to strip the completed trays from the forming blocks; said driving means being adapted to drive the articulated carrier member intermittently, and to actuate the feed means, wall fastening means, and stripper means while the carrier is stationary.

29. In a machine for forming trays from sheets of paper, means for creasing the paper to outline a portion, at least, of a tray bottom, an articulated carrying and forming block movable through a predetermined path, forming blocks on said articulated member adapted to support sheets of paper on their forward faces, the paper being of a size to extend beyond the edges of the blocks with the creases in the paper overlying the edges of said forward faces, stationary forming plates arranged in the path of the extending paper as carried by the blocks, means for moving the articulated member through its path whereby the forming plates engage the extending paper to bend it at the creases and press it toward the side faces of the blocks; said forming plates comprising side formers adapted to form the tray sides, end formers adapted to form the tray ends, said side and end formers leaving double thickness flaps of excess stock extending at the tray corners substantially in the plane of the tray sides, and means on said end formers to fold the flaps against the tray ends; means to fasten the flaps to the tray ends, and means to strip the completed tray from the forming block; said stripping means embodying a member at the forward face of the block and movable outwardly therebeyond, and means so to move the member.

30. In a machine for forming trays from sheets of paper, means for creasing the paper to outline a portion, at least, of a tray bottom, an articulated carrying and forming member movable through a predetermined path, forming blocks on said articulated carrier adapted to support sheets of paper on their forward faces, the paper being of a size to extend beyond the edges of the blocks with the creases in the paper overlying the edges of said forward faces, stationary forming plates arranged in the path of the extending paper as carried by the block, and means for moving the articulated member through its path whereby the forming plates engage the extending paper to bend it at the creases and press it toward the side faces of the block to form vertical tray walls, reciprocating punches for fastening adjacent tray walls together at the corners, and means to strip the completed tray from the forming block; said articulated carrier moving means comprising a star wheel operatively connected to the reciprocating member and a crank arm adapted to intermittently engage the star wheel to rotate it and to actuate said punches between successive star wheel engagements.

31. In a machine of the character described, a forming block advanced through a closed circuit to form a tray thereon, means to strip the tray from the block at a definite point in the block travel, a tray receiving member normally withdrawn from the path of the block but movable into the block path to receive the stripped tray therefrom, and means to so move the tray receiving member.

32. In a machine of the character described having a forming block moving in a predetermined path, an inclined tray receiving slide normally withdrawn from the path of the block but movable into the path of the block to receive a completed tray removed from the block and to remove the tray from the path of the block.

WILLIAM WALTER HARTMAN.